(No Model.)
J. W. WHITTIC.
SPRING VEHICLE.
No. 326,823. Patented Sept. 22, 1885.
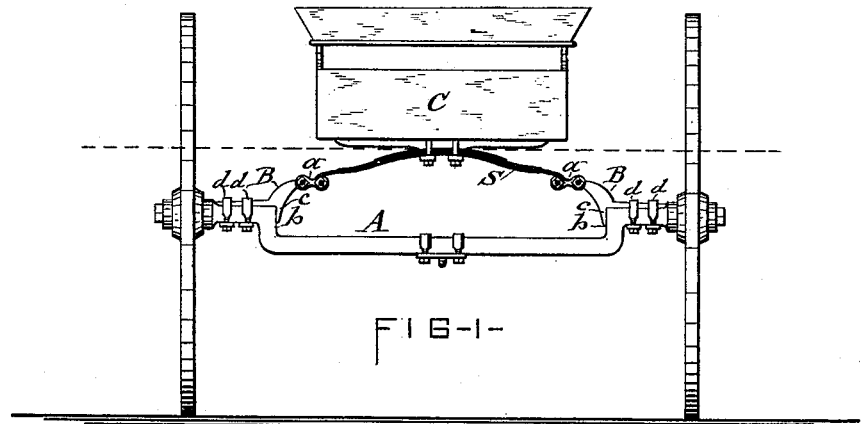
FIG-1-
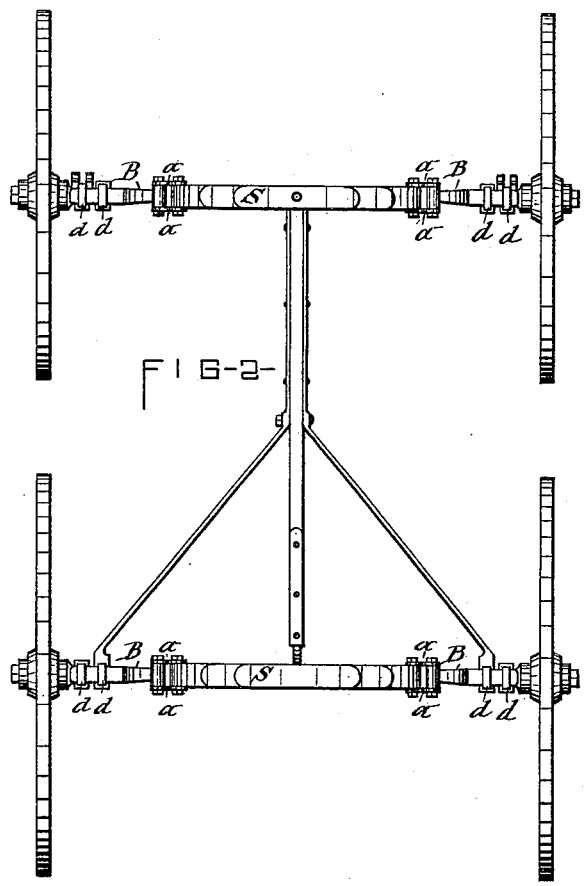
FIG-2-
ATTEST—
Wm. C. Raymond
C. Bendixon
INVENTOR—
John W. Whittic

United States Patent Office.

JOHN W. WHITTIC, OF SYRACUSE, NEW YORK.

SPRING-VEHICLE.

SPECIFICATION forming part of Letters Patent No. 326,823, dated September 22, 1885.

Application filed April 1, 1885. (No model.)

*To all whom it may concern:*

Be it known that I, JOHN W. WHITTIC, of Syracuse, in the county of Onondaga, in the State of New York, have invented new and useful Improvements in Spring-Vehicles, of which the following, taken in connection with the accompanying drawings, is a full, clear, and exact description.

This invention relates to the class of spring-vehicles which have cross-springs hung at their ends on supports attached to the axle; and the invention consists in an improved construction of the spring-support, in combination with a downwardly-deflected axle, which latter affords secure abutments for the spring-supporting arm and allows the spring to be set much lower than those of other analogous vehicles, and consequently carries also the body of the vehicle lower, and thus renders it easier to mount and to alight from.

In the accompanying drawings, Figure 1 is a rear end view of my improved spring-vehicle, and Fig. 2 is a plan view of the same with the body removed to better illustrate the arrangement of the springs.

Similar letters of reference indicate corresponding parts.

A represents the axle, which is formed with a depressed central portion terminating with abrupt offsets $b\,b$ a short distance back of the wheels. On the end portions of the axle, immediately back of the wheels, are mounted arms B B, which project from the top of the axle toward the center of the same. Said arms are rigidly attached to the axle, and may be forged thereon, though I prefer to make them separate and attach them to the axle by means of clips $d\,d$; and in order to give them additional support, to better resist the outward strain, I provide them with downward-projecting shoulders $c$, by which they abut against the offsets $b\,b$ of the axle. To the free ends of said arms are connected links $a\,a$, and on these links are hung the ends of the cross-spring S, which latter is thus supported over the axle and parallel therewith. The body C being mounted on the two cross-springs supported over the two axles in the manner aforesaid produces a very simple, neat, yet strong and easy-riding vehicle.

The object of the downward deflection of the axle, in combination with the spring-supporting arms projecting over said deflection, is to allow greater range of play to the spring, and also to allow the spring to be set lower, and thus render the body easier of access and easier to alight from, as hereinbefore stated.

Having described my invention, what I claim as new, and desire to secure by Letters Patent, is—

1. The combination of the axle A, formed with the depressed central portion, and the spring-supporting arms B B, mounted on the end portions of the axle and projecting over the depressed portion of the same, substantially as described and shown.

2. The combination of the axle A, formed with a depressed central portion terminating with abrupt offsets $b\,b$, the arms B B, mounted on top of and clipped on the axles outside of the offsets $b\,b$ and provided with the shoulder $c$, links $a\,a$ on said arms, and the cross-spring S, hung at its ends on said links, substantially as described and shown.

In testimony whereof I have hereunto signed my name and affixed my seal, in the presence of two attesting witnesses, at Syracuse, in the county of Onondaga, in the State of New York, this 28th day of March, 1885.

JOHN W. WHITTIC. [L. S.]

Witnesses:
FREDERICK H. GIBBS,
E. C. CANNON.